United States Patent
Widiaman et al.

(10) Patent No.: US 9,924,783 B2
(45) Date of Patent: Mar. 27, 2018

(54) PROTECTIVE JACKET WITH A STRAP

(71) Applicant: HEWLETT-PACKARD DEVELOPMENT COMPANY, L.P., Houston, TX (US)

(72) Inventors: Rudy Widiaman, Houston, TX (US); Eric Chen, Houston, TX (US); Vincent Kenya Shyu, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/309,821

(22) PCT Filed: Aug. 28, 2014

(86) PCT No.: PCT/US2014/053313
§ 371 (c)(1),
(2) Date: Nov. 9, 2016

(87) PCT Pub. No.: WO2016/032499
PCT Pub. Date: Mar. 3, 2016

(65) Prior Publication Data
US 2017/0265634 A1    Sep. 21, 2017

(51) Int. Cl.
| | |
|---|---|
| *H04M 1/00* | (2006.01) |
| *A45F 5/00* | (2006.01) |
| *A45C 11/00* | (2006.01) |
| *A45C 13/00* | (2006.01) |
| *G06F 1/16* | (2006.01) |
| *H04B 1/3888* | (2015.01) |

(52) U.S. Cl.
CPC ............... *A45F 5/00* (2013.01); *A45C 11/00* (2013.01); *A45C 13/002* (2013.01); *G06F 1/1626* (2013.01); *H04B 1/3888* (2013.01); *A45C 2011/002* (2013.01); *A45C 2011/003* (2013.01)

(58) Field of Classification Search
None
See application file for complete search history.

(56) References Cited

U.S. PATENT DOCUMENTS

| | | | |
|---|---|---|---|
| 5,404,267 | A | 4/1995 | Silva et al. |
| 8,567,599 | B2 | 10/2013 | Beatty et al. |
| 2006/0076381 | A1 | 4/2006 | Rodarte et al. |
| 2011/0309117 | A1 | 12/2011 | Roberts |

(Continued)

FOREIGN PATENT DOCUMENTS

| | | |
|---|---|---|
| DE | 202013104161 U1 | 10/2013 |
| EP | 1792834 A2 | 6/2007 |
| KR | 10-1264064 B1 | 5/2013 |

OTHER PUBLICATIONS

"Grip Assist Case for ATIV Tab 7 or Smart PC Pro," 2014, pp. 1-2, Samsung.

(Continued)

*Primary Examiner* — Mohammed Rachedine
(74) *Attorney, Agent, or Firm* — HPI Patent Department

(57) ABSTRACT

A protective jacket for a portable computing device in accordance with one example includes a strap removably attached to the jacket by a pair of attachment members. The strap includes a plurality of holes and the jacket includes a pair of connectors. The pair of attachment members is coupled to the pair of connectors via the plurality of holes, to removably attach the strap to the jacket.

14 Claims, 3 Drawing Sheets

(56) References Cited

U.S. PATENT DOCUMENTS

| | | | |
|---|---|---|---|
| 2012/0008880 A1* | 1/2012 | Toth | A45C 11/00 383/42 |
| 2012/0063066 A1 | 3/2012 | Floit | |
| 2013/0220841 A1 | 8/2013 | Yang | |
| 2014/0049060 A1* | 2/2014 | Rayner | A45F 5/10 294/25 |
| 2014/0084035 A1 | 3/2014 | Georges | |
| 2015/0265018 A1* | 9/2015 | Balourdet | A45C 13/008 455/575.8 |

OTHER PUBLICATIONS

"Reivew: Modulr—Ipad Case with Many Accessories," Apr. 5, 2011, pp. 1-61, iPhone J.D.

Kindsupplies, "Laptop Sleeve Navy / Case / Bag / Pouch with Leather Strap / Handles—Hold Your Dream," May 12, 2014, pp. 1-3, Etsy, Inc.

Riley Alexander, "Fujitsu Lifebook T580 Tablet PC," Feb. 10, 2011, pp. 1-17, MobileHealthComputing.com.

Vitaly Friedman, "Laptop Sleeves, Skins and Stickers," Mar. 17, 2008, pp. 1-65, Smashing Magazine.

\* cited by examiner

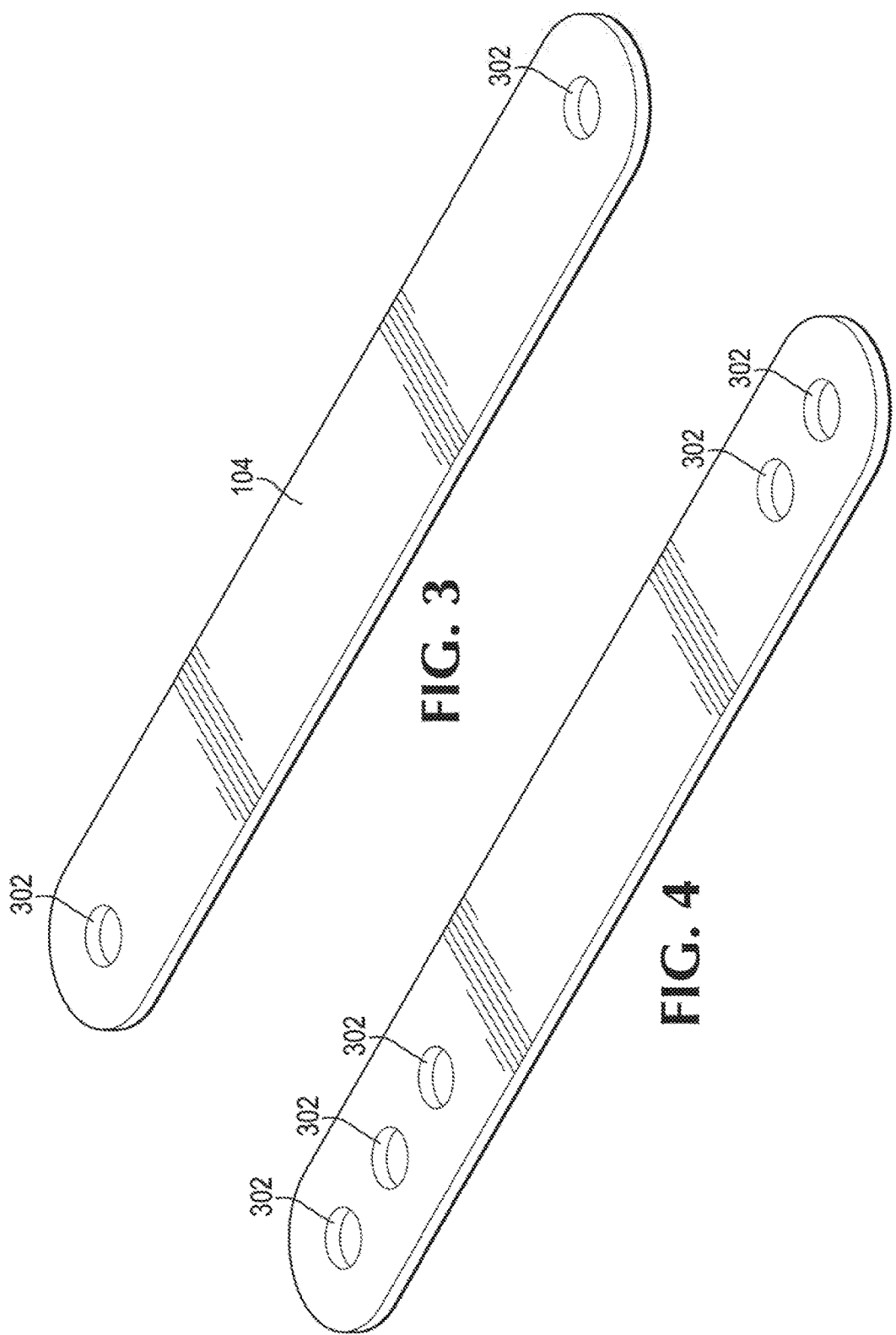

PROTECTIVE JACKET WITH A STRAP

BACKGROUND

The emergence and popularity of mobile computing has made portable computing devices a staple in today's marketplace, due to their compact design and light weight. Tablet computers are examples of portable computing devices that are widely used. Tablet computers generally employ a touchscreen on a display surface of the tablet that may be used for both viewing and input. Users of tablets may interact with the touchscreen via finger or stylus gestures. As an example, an on-screen keyboard may be illustrated on the touchscreen surface for entering characters.

BRIEF DESCRIPTION OF THE DRAWINGS

Some examples of the present application are described with respect to the following figures:

FIGS. 3-4 illustrate the strap including a plurality of holes, according to one example.

DETAILED DESCRIPTION

Figure 1:
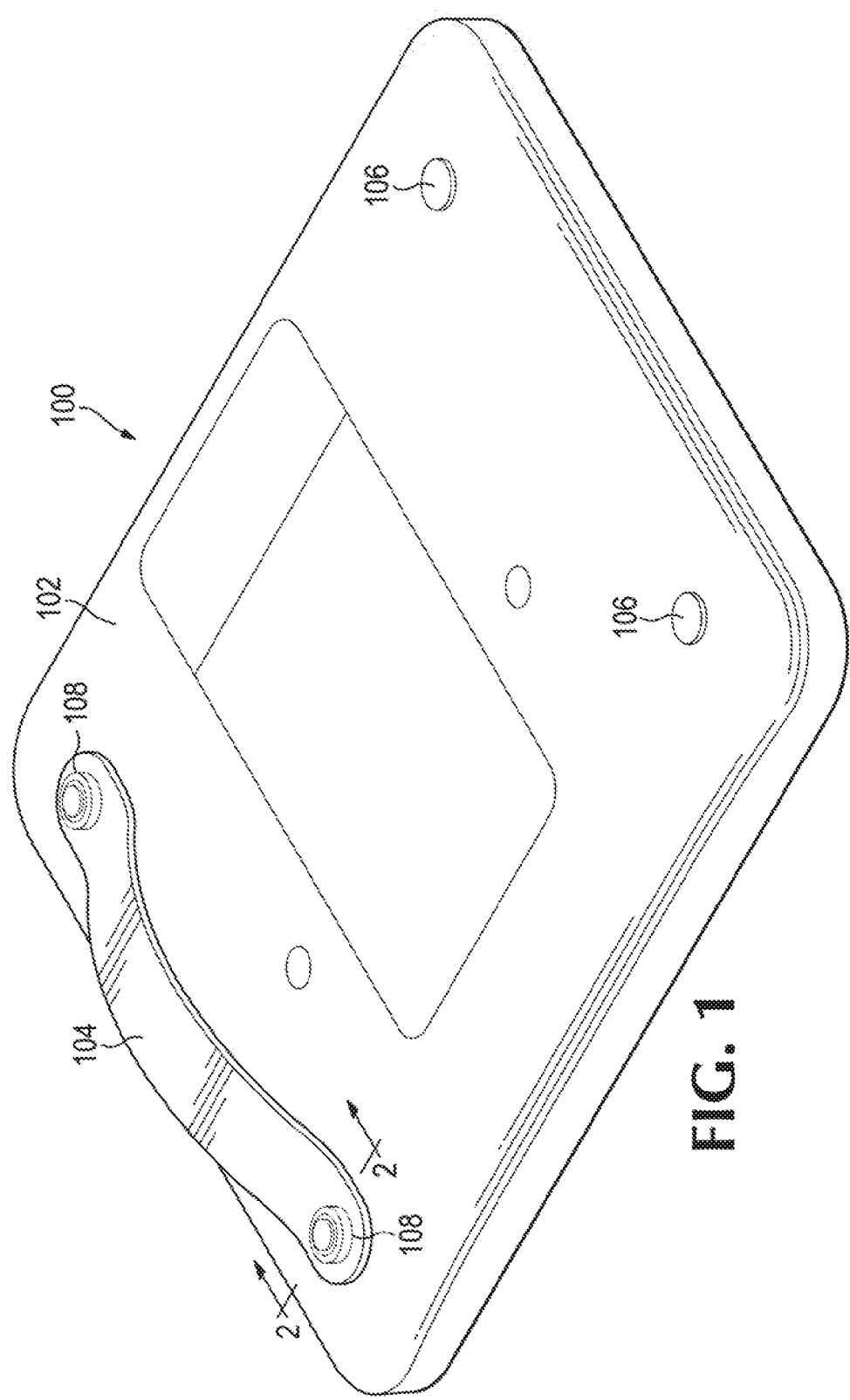
FIG. 1 illustrates a protective jacket for a portable computing device, including a strap, according to one example.

While using a portable computing device such as a tablet computer, it may be desirable to protect the device from external environment, or to make the device suitable for tough environments. For example, the protective jacket may prevent damage to the device from accidental drops and other external environmental conditions such as water/liquid, dirt, dust, and debris.

In certain situations, a user may need to hold the device with one hand while using the other hand to perform other tasks and/or to interact with the device (e.g., via the touchscreen). In such situations, it may be desirable to have a strap that can accommodate users' hand preferences (i.e., left hand or right hand). In addition, it may be desirable to have a strap that can accommodate different user hand/palm sizes. Furthermore, it may be desirable to have a strap that is easily to deploy, clean, and comfortable to the user.

Examples disclosed address the above needs and flexibility by providing a strap that can accommodate a left-handed or right-handed user by easily and quickly (without tools) moving the strap to the left side or right side of the jacket, using attachment pins. The attachment pins pass through holes provided on opposite ends of the strap and engage with openings on the jacket to removably attach the strap to the jacket. The attachment pins can easily engage and disengage from the openings on the strap without use of tools. In addition, the strap can include a plurality of holes on different locations on the ends of the strap to provide multiple adjustment and give flexibility for different user hand sizes. According to the described examples, the strap can be formed from double injection molding using thermoplastic polyurethane (TPU) material that is easy to clean and comfortable to the user's hand. The strap and the jacket can include antibacterial coating, and the jacket can conform to at least an IP54 rating protection (e.g., for use in the healthcare industry).

In one example, a protective jacket for a portable computing device includes a strap removably attached to the jacket by a pair of attachment members. The strap includes a plurality of holes and the jacket includes a pair of connectors. The pair of attachment members is coupled to the pair of connectors via the plurality of holes, to removably attach the strap to the jacket.

In another example, a protective jacket for enclosing a back surface and sidewalls of a portable computing device includes a strap and a pair of attachment pins. The strap includes a first hole and a second hole on opposite ends of the strap. The pair of attachment pins is to removably attach the strap to a first opening and a second opening on the jacket through the first and second holes of the strap. The strap is to receive a user's hand between the strap and the device to hold the device.

In another example, a system includes a portable computing device including a display surface and a back surface opposite the display surface, and a protective jacket for enclosing at least the back surface and sidewalls of the device. The jacket includes a strap and a pair of attachment pins. The strap includes a first hole and a second hole, where the first and second holes are on opposite ends of the strap. The pair of attachment pins is to removably attach the strap to a first connector and a second connector on the jacket via the first and second holes of the strap. The strap is to receive a user's hand to hold the device.

As used herein, "portable competing device" and "device" may be used interchangeably and refer to any one of various tablets, smartphones, cellular telephones, personal digital assistants (PDAs), laptops, notebooks, "phablet" devices (i.e., phone/tablet devices), computers, and any otter similar electronic devices.

Referring now to the figures, FIG. 1 illustrates a protective jacket for a portable confuting device, including a strap, according to an example. Computing device 100 can be a tablet computer, for example. However, device 100 can be any portable computing device such as a laptop computer, a notebook computer, a mobile device (e.g., a smartphone), a "phablet" device (i.e., phone/tablet device), a hybrid compute, or any other portable computing device.

Device 100 can include a display surface and a back surface opposite the display surface. Device 100 can include sidewall around a perimeter of the device 100. For example, device 100 can include four (4) sidewalls (a left sidewall a right sidewall, a top sidewall, and a bottom sidewall). Device 100 can be fitted with a jacket 102 for enclosing at least the back surface and sidewalls of the device 100. Jacket 102 can be constructed from at least one of metal, plastic, fiber, resin, and any other suitable material.

In some examples, jacket 102 complies with at least an IP54 rating protection against solid and liquid ingress to the device 100 and can include an antibacterial coating, which may be desirable in certain use cases such as the healthcare/medical industry. As used herein, "IPXX rating" refers to a specific ingress protection (IP) standard marking or code. The IP standard classifies and rates the degree of protection provided against the intrusion (including body parts such as hands and fingers), dust, accidental contact, and water by mechanical casings and electrical enclosures, and is published by the International Electrotechnical Commission (IEC). In the "IPXX" rating, the first digit indicates the level of protection that the enclosure provides against access to hazardous parts and the ingress of solid foreign objects, and the second digit indicates the level of protection that the enclosure provides against harmful ingress of water.

Jacket 102 includes a strap 104 removably attached to the jacket 102 to hold the device 100 when the user's hand is placed between the strap 104 and the device 100. The strap 104 can be attached to the jacket 102 by using a pair of attachment members 108 (or pins). Strap 104 can be attached to the jacket 102 by passing the attachment members 108 through holes (not shown) provided on opposite ends of the strap 104 and coupling or engaging the attachment members 102 to connectors 106 (or openings) provided on the jacket 102. Connectors 106 provided on the jacket 102 can the female connectors to receive the attachment members 108 (male connectors/pins), for attaching the strap 104 to the jacket 102.

Jacket 102 can include a pair of connectors 106 each on opposite sides (e.g., left side and right side) of the jacket to provide flexibility to accommodate the user's hand preference (i.e., left hand or right hand). Accordingly, the strap 104 can be moved from the left side of the jacket 102 to the right side of the jacket 102, and vice versa, to accommodate left or right handed users. Attachment members 108 can include a depressible region (shown in FIG. 2) to engage and disengage the attachment members 108 from the connectors 106 on the jacket 102, thereby providing easy attachment and removal of the strap 104 from the jacket 102. Accordingly, the strap 104 can be easily deployed or moved from one side of the jacket 102 to another, based on the user's preference, without tools. Attachment member 108 is described in further detail in FIG. 2.

Jacket 102 also includes caps (not shown) to cover the connectors 106 when the strap 104 is not attached. For example, when the strap 104 is not attached at a particular side of the jacket 102, the connectors 106 on that side can be covered with the caps to prevent liquid and/or solid ingress. In some examples, the caps can be made of rubber, or any other suitable material to prevent unwanted ingress of external materials.

The strap 104 can include a plurality of holes on each end of the strap 104, as shown in FIGS. 3-4, to provide flexibility for different user hand sizes. For example, the strap 104 may include a first set of holes on one end of the strap 104 and a second set of holes on the other end of the strap 104, such that the strap 104 can be adjusted to fit various hand sizes. In some examples, the strap 104 can be made from a thermoplastic polyurethane (TPU) material. Further, the strap 104 can be made from double injection molding to achieve two (2) durometer levels. As used herein, "durometer" is a measure of rubber density level. The strap 104 can include 2 levels of durometer between from 50 to 70, allowing a robust construction without sacrificing comfort. For example, the ends of the strap 104 (i.e., around where the holes are located) can have a durometer level of 40, and the central/main part of the strap 104 (i.e., where the user's hands fit) can have a durometer level of 60. In certain examples, the strap 104 can include an antibacterial coating. The strap 104 is described in further detail in FIGS. 3-4.

In some examples, the jacket 102 is removably attached to the device 100. In such an example, the device 100 can be separated or removed from the jacket 102 (e.g., with little or no effort). In other examples, the jacket 102 is integrated with the device 100. In such an example, the device 100 may be separated from the jacket 102 using tools to separate the attachment of the device 100 to the jacket 102.

Figure 2:
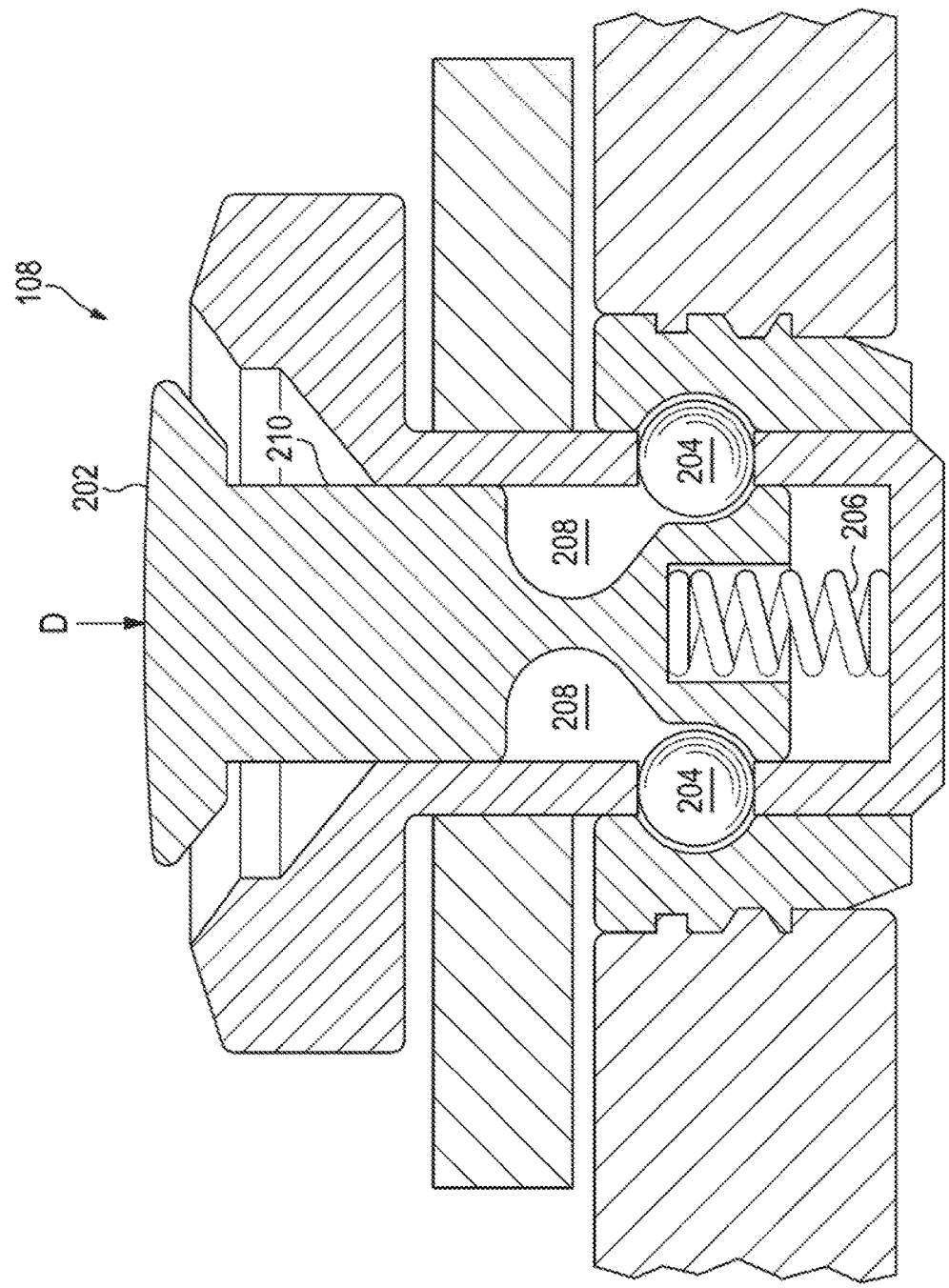
FIG. 2 illustrates a sectional view of an attachment member for removably attaching the strap to the protective jacket, according to one example.

FIG. 2 illustrates a sectional view of an attachment member for removably attaching the strap to the protective jacket, according to one example. Attachment member 108 includes a depressible region 202 for engaging the attachment member 108 to the connectors 106 of the jacket 102 and for disengaging the attachment member 108 from the connectors 106 of the jacket 102.

Attachment member 108 includes a shaft 210 having hollow regions 208. Attachment member 108 also includes ball hearings 204 and a spring member 206. In a first scenario, when the depressible region 202 is pushed downwards (as shown by arrow D), the shaft 210 pushes against the spring member 206 causing the ball hearings 204 to be retracted into the hollow regions 208 of the shaft 210 thereby disengaging, uncoupling, or releasing the attachment member 108 from the connector 106. In a second scenario, when the depressible region 202 is pushed downwards, the shaft 210 pushes against the spring member 206, causing the distal end of the shaft 210 to push against the ball bearing 204 and push the ball bearing 204 to the connector 106, thereby engaging or coupling the attachment member 108 to the connector 106. It should be noted that the attachment mechanism is not limited to the example described FIG. 2. For example, other coupling mechanisms could be adapted to removably couple the attachment member 108 to the connectors 106.

FIGS. 3-4 illustrate the strap including a plurality of holes, according to one example. In the example of FIG. 3, strap 104 includes a hole 302 on each end of the strap 104. The strap 104 can be removably attached to the jacket 102 by passing the attachment members 108 through holes 302 and coupling the attachment member 108 to the connectors 106. The strap 104 can be moved from one side of the jacket 102 to another side based on the user's hand preference. Strap 104 can be easily removed and sanitized, washed, or wiped, as necessary. In certain examples, the strap 104 is made from a TPU rubber with an antibacterial coating. In some examples, the strap 104 is formed by double injection molding with varying durometer levels (e.g., 40 and 60), and is comfortable to the user's hand. In the example of FIG. 4, step 104 includes multiple holes on each end of the strap 104. For example, one end of the strap 104 may include three holes 302 and the opposite end of the strap 104 may include two holes 302*he* right end of the. Accordingly, the strap 104 can be adjusted to fit various hand sizes.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fall within the true spirit and scope of the present disclosure.

What is claimed is:

1. A protective jacket for a portable computing device, the jacket comprising:
   a strap removably attached to the jacket by a pair of attachment members, wherein the strap includes a plurality of holes and the jacket includes a first pair of connectors on a first side of the jacket and a second pair of connectors on a second side of the jacket; and
   a plurality of caps to cover the first pair and the second pair of connectors when the strap is not attached to the jacket, wherein the pair of attachment members is coupled to the pair of connectors via the plurality of holes to removably attach the strap to the jacket.

2. The protective jacket of claim 1, wherein the strap is to receive a user's hand to hold the device.

3. The protective jacket of claim 1, wherein the plurality of holes of the strap includes a first set of holes and a second set of holes on opposite ends of the strap to accommodate a user's hand size when the strap is attached to the jacket.

4. The protective jacket of claim 1, wherein the jacket includes a first pair of connectors on a first side of the jacket and -a second pair of connectors on a second side of the jacket opposite the first side, to accommodates a user's hand preference.

5. The protective jacket of claim 1, wherein the strap is a thermoplastic polyurethane (TPU) strap and includes an antibacterial coating, and wherein the jacket includes the antibacterial coating.

6. The protective jacket of claim 1, wherein the pair of attachment members each include a depressible region to engage the attachment members to the plurality of holes and to release the attachment members from the plurality of holes.

7. The protective jacket of claim 1, wherein the jacket is removably attached to the device.

8. The protective jacket of claim 1, wherein the jacket is integrated with the device.

9. A protective jacket for enclosing a back surface and sidewalls of a portable computing device, the jacket comprising:
    a first pair of connectors on a first side of the jacket and a second pair of connectors on a second side of the jacket;
    a strap including a first hole and a second hole on opposite ends of the strap;
    a plurality of caps to cover the first pair and the second pair of connectors when the strap is not attached to the jacket; and
    a pair of attachment pins to removably attach the strap to a first opening and a second opening on the jacket through the first and second holes of the strap, wherein the strap is to receive a user's hand between the strap and the device to hold the device.

10. The protective jacket of claim 9, wherein the strap includes a plurality of first holes on one end of the strap and a plurality of second holes on another end of the strap to accommodate the user's hand size when the strap is attached to the jacket.

11. The protective jacket of claim 9, wherein the first and second opening of the jacket are located on one side of the jacket, the jacket further comprising third and fourth openings on another side of the jacket, to accommodate the user's hand preference.

12. The protective jacket of claim 9, wherein the strap is made from a double injection molded thermoplastic polyurethane (TPU) material.

13. A system comprising:
    a portable computing device including a display surface and a back surface opposite the display surface; and
    a protective jacket for enclosing at least the back surface and sidewalls of the device, the jacket comprising:
        a first pair of connectors on a first side of the jacket and a second pair of connectors on a second side of the jacket;
        a strap including a first hole and a second hole, wherein the first and second holes are on opposite ends of the strap;
        a plurality of caps to cover the first pair and the second pair of connectors when the strap is not attached to the jacket; and
        a pair of attachment pins to removably attach the strap to a first connector of the first pair of connectors and a second connector of the second pair of the connectors on the jacket via the first and second holes of the strap,
    wherein the strap is to receive a user's hand to hold the device.

14. The protective jacket of claim 13, wherein the jacket complies with at least an Ingress Protection (IP) standard rating of IP54.

* * * * *

UNITED STATES PATENT AND TRADEMARK OFFICE
CERTIFICATE OF CORRECTION

| | |
|---|---|
| PATENT NO. | : 9,924,783 B2 |
| APPLICATION NO. | : 15/309821 |
| DATED | : March 27, 2018 |
| INVENTOR(S) | : Rudy Widiaman et al. |

Page 1 of 1

It is certified that error appears in the above-identified patent and that said Letters Patent is hereby corrected as shown below:

In Column 5, Line 3, in Claim 4, after and delete "-a".

In Column 5, Line 4, in Claim 4, delete "accommodates" and insert -- accommodate --, therefor.

Signed and Sealed this
Thirty-first Day of July, 2018

Andrei Iancu
*Director of the United States Patent and Trademark Office*